United States Patent [19]

Desai

[11] Patent Number: 4,915,718

[45] Date of Patent: Apr. 10, 1990

[54] FABRICATION OF INK JET NOZZLES AND RESULTING PRODUCT

[75] Inventor: Prakash D. Desai, San Jose, Calif.

[73] Assignee: On Target Technology, Inc., Santa Clara, Calif.

[21] Appl. No.: 250,354

[22] Filed: Sep. 28, 1988

[51] Int. Cl.[4] .................... C03C 25/06

[52] U.S. Cl. .................... 65/31; 65/61; 156/644; 156/660; 156/663; 346/1.1; 346/140 R

[58] Field of Search .................... 65/31, 61; 346/1.1, 346/140 PD; 156/644, 660, 663

[56] References Cited

U.S. PATENT DOCUMENTS

| | | | |
|---|---|---|---|
| 4,125,845 | 11/1978 | Stevenson | 346/140 PD |
| 4,339,763 | 7/1982 | Kyser et al. | 346/140 PD |
| 4,506,276 | 3/1985 | Kyser et al. | 346/140 PD |
| 4,549,188 | 10/1985 | Shackleton | 65/31 X |
| 4,786,303 | 11/1988 | Padalino | 346/1.1 X |

*Primary Examiner*—Robert L. Lindsay
*Attorney, Agent, or Firm*—Thomas M. Freiburger

[57] ABSTRACT

In the fabrication of an ink jet nozzle structure for ink jet printing, photoform glass is initially exposed in the general configuration of the ink chambers and nozzles desired to be formed in the glass. Thin transverse lines are left unexposed across the desired transition point between the ink chamber and the nozzle, and across a transition between ink inlet and the chamber. The ink chamber is desired to be of greater depth than either the inlet area or the nozzle, so two-step acid etching is used. The nozzle and the inlet are masked, as by taping, during a portion of the acid etching and unmasked during another portion, so that the chamber (which is never masked) is etched deeper than the inlet and nozzle areas. In order to assure the acid does not under-etch the tape, obscuring the transition between the chamber and the nozzle or inlet areas and causing manufacturing variations and inconsistency of the performance of the ink jet, the unexposed lines in the photoform glass remain as barriers at these transitions. Etching acid cannot encroach underneath the mask, with the barrier remaining. After the etching is complete, the thin barriers are easily removed by mechanical action, such as sandblasting, leaving sharp and consistent transitions at both ends of the ink chamber.

4 Claims, 4 Drawing Sheets

FABRICATION OF INK JET NOZZLES AND RESULTING PRODUCT

BACKGROUND OF THE INVENTION

Invention relates to ink jet printer apparatus and systems, and in particular is directed to a method for fabricating an ink jet nozzle structure or print head to achieve a desired geometry and consistency in production.

In ink jet printers, generally an ink jet nozzle structure or print head is formed on a small "chip" of rigid material constructed to have an ink inlet, an ink chamber and an ink jet nozzle for each plurality of streams or jets of ink to be expelled toward a surface upon which printing is to be executed. The ink jets may comprise a continuously pumped stream which is electrostatically charged and steered by a variable electric field; or they can be in a series or matrix of jet nozzles, each of which expels a drop of ink at a time on demand. These "drop on demand" ink jet printers are often controlled by pulses of pressure on a bladder-like ink chamber just upstream of the nozzle, with each pulse producing a single droplet of ink. The ink chamber is continuously resupplied with ink from an inlet end to replenish ink expelled in the series of droplets. Drop on demand ink jet nozzles may be pulsed by piezoelectric pulsing of the bladder or by heating of a region inside the ink chamber, sometimes known as "bubble jet."

Patents showing conventional ink jet print heads include U.S. Pat. Nos. 3,946,398, 4,189,734, 4,216,483, 4,339,763, 4,125,845 and 4,506,276.

In the fabrication of print heads or nozzle heads for ink jet printers, it has been conventional to use a base piece of photoform glass, which is exposed photographically in the pattern (in plan view) of ink channels which is desired and then developed, then subjected to an acid etch on one side to form the channels. The channels generally are to be of different depths in different portions of their lengths, with a deeper portion for the ink chamber. The different depths have conventionally been achieved using a double etching procedure. In one step of the double etching process, the shallower portions of the channel are masked off by tape or other masking agents. Thus, the masked off areas are not etched while masked, but are only etched in another step wherein the photoform glass base is unmasked. As a result, the areas which have been masked part of the time are etched to a lesser depth than the ink chamber portion, which is not masked at all during etching.

Taping, which has usually been used for the masking of the shallower portions in one phase of the acid etching of the photoform glass plate, has been inherently subject to error and variation in the positioning of the tape and in the resulting etched product. It has been difficult to consistently place the tape in precisely the correct position transversely across the channels; also, even with tape correctly positioned, the acid will under-etch the tape to some degree and to a varying degree from plate to plate, resulting in a nonsharp transition and variation in the geometry of the print head from part to part in the manufacturing process. This results in variation in the printing performance from print head to print head, and is thus very undesirable.

It is desirable to have transitions between the shallow and deep areas of print head channels which are extremely consistent in location from print head to print head, which are sharp and square in cross section, and which exhibit precise uniformity in performance characteristics in service of the print heads. These are objects of the present invention described below.

SUMMARY OF THE INVENTION

In accordance with the present invention, ink jet print heads are fabricated of photoform glass by exposing and developing the glass plate or base, then acid etching in a two step procedure with masking. However, rigid transverse barriers are formed in precise locations in the exposing/developing steps, at transition points between shallower sections and the deeper ink chamber area. These transverse lines, which may be about 19 microns in width, are formed photographically by not exposing the two lines to light in the photo-exposure step. This leaves the two narrow lines substantially immune to the acid etching, throughout the depth of the photoform glass base.

The unexposed barrier lines establish precise location of the depth transitions and precisely controlled cross-sectional geometry of the print head. They allow some degree of latitude in the accuracy of taping (or other masking), since the barrier has some width; and they also prevent under-etching of the tape or other mask, by providing a deep barrier against action of the acid, even if it creeps under the mask to some degree.

When the two-step etching procedure is completed and the mask has been removed, the thin, rigid barriers remain in place, extending up to the surface of the glass base piece as a dam between a shallow side and a deep side. The thin barriers are removed by mechanical means, preferably by sandblasting. This leaves a precisely controlled print head geometry, with the desired sharp and square transitions between deep and shallow portions in the length of the ink channels.

It is therefore among the objects of the invention to improve in fabrication technique for producing ink jet print heads of photoform glass and to produce a precisely controlled geometry in the ink channels for proper and consistent operation of the print head from one print head to another. These and other objects, advantages and features of the invention will be apparent from the following description of a preferred embodiment, considered along with the accompanying drawings.

DESCRIPTION OF A PREFERRED EMBODIMENT

Figure 1:
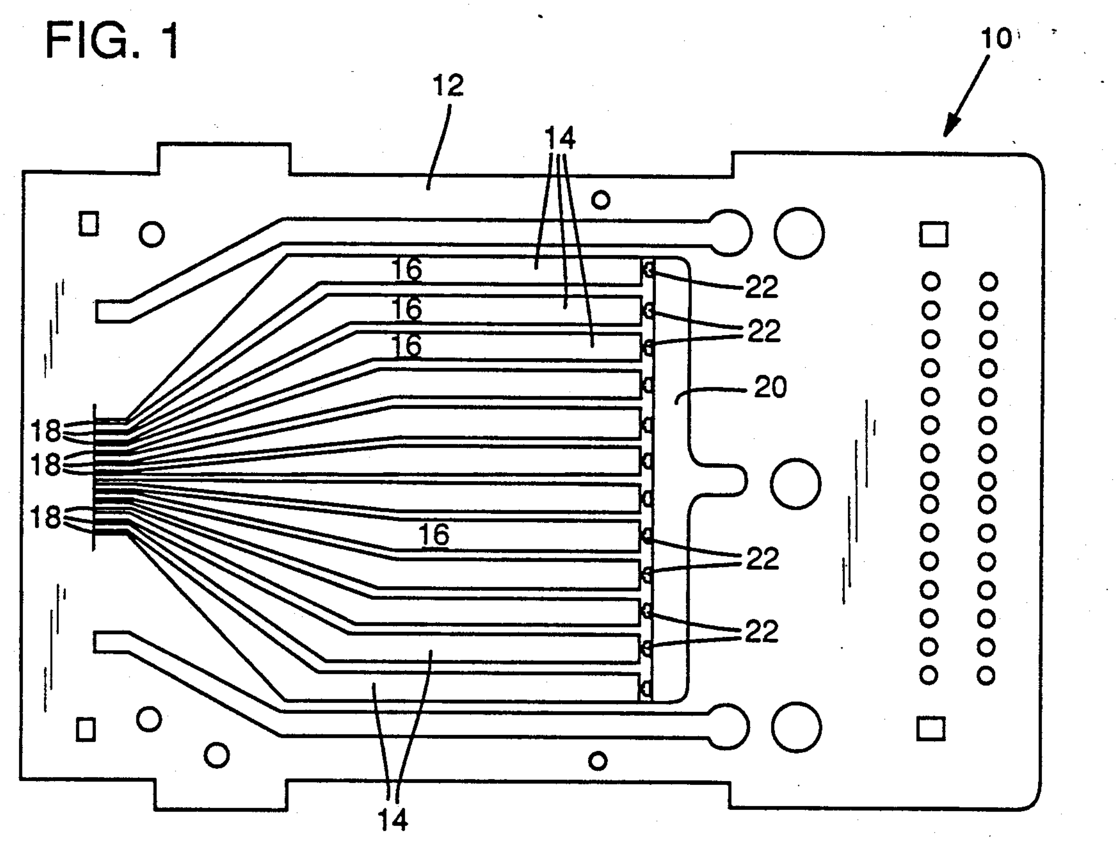
FIG. 1 is a plan view showing an ink jet print head base plate, with a layout of ink channels as they are seen in plan view.

In the drawings, FIG. 1 shows a base plate 10 for an ink jet print head. The base plate 10 is formed of a photoform glass plate 12 which is photographically exposed in the desired pattern of channels 14, then developed to make the exposed area susceptible to acid etching, which forms the channels in one side of the plate.

As is well known in the art, the photoform glass plate 12 contains silver compounds which can be exposed and developed, and then which selectively make the plate susceptible to acid etching such that the exposed areas are highly susceptible to acid etching, while the unexposed areas are only very slightly susceptible.

FIG. 1 shows a print head base plate 12 with twelve ink channels, as one example of a construction according to the invention. As illustrated, the ink channels have relatively wide chambers 16 which taper down in width to end in nozzles 18 (appearing as lines in FIG. 1) at a nozzle end of the channels. The nozzles 18 may be arranged in a line, together forming a height H which is the height of characters to be printed. Thus, the base plate 10 is greatly enlarged as seen in FIG. 1.

From the upstream end of the base plate 10, the ink first enters an ink manifold 20, then passes through a parallel plurality of ink inlets 22 or restrictors which may be generally nozzle-shaped as indicated. The ink passes through these nozzle-inlets into the ink chambers 16 of the channels 14.

It is the ink chambers 16 which are subjected to pulses of pressure in a drop-on demand type printer, to produce droplets of ink ejected from the ink nozzles 18. Thus, each ink channel 14 has a separate pulsing means (such as piezoelectric or resistance heat).

A cover plate (not shown) is laminated to the print head base plate 10 after the base plate has been fabricated with the manifold 20, channels 14, etc. etched into one surface. Neither the cover plate nor the lamination process form an important part of the present invention.

The invention is concerned with a method for producing the etched base plate 10, and particularly the method of accurately, precisely and consistently forming the manifold 20, the ink inlets or restrictors 22, the ink chambers 16 and the ink nozzles 18. These portions are not all etched to the same depth, and the process for forming the various portions with precisely controlled transitions between them is a central feature of the invention.

Figure 2A:
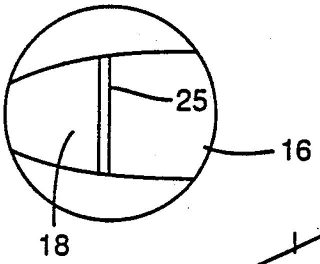
FIG. 2A is a further enlarged partial plan view showing a small portion of the base plate near the nozzle end of the print head.
Figure 2:
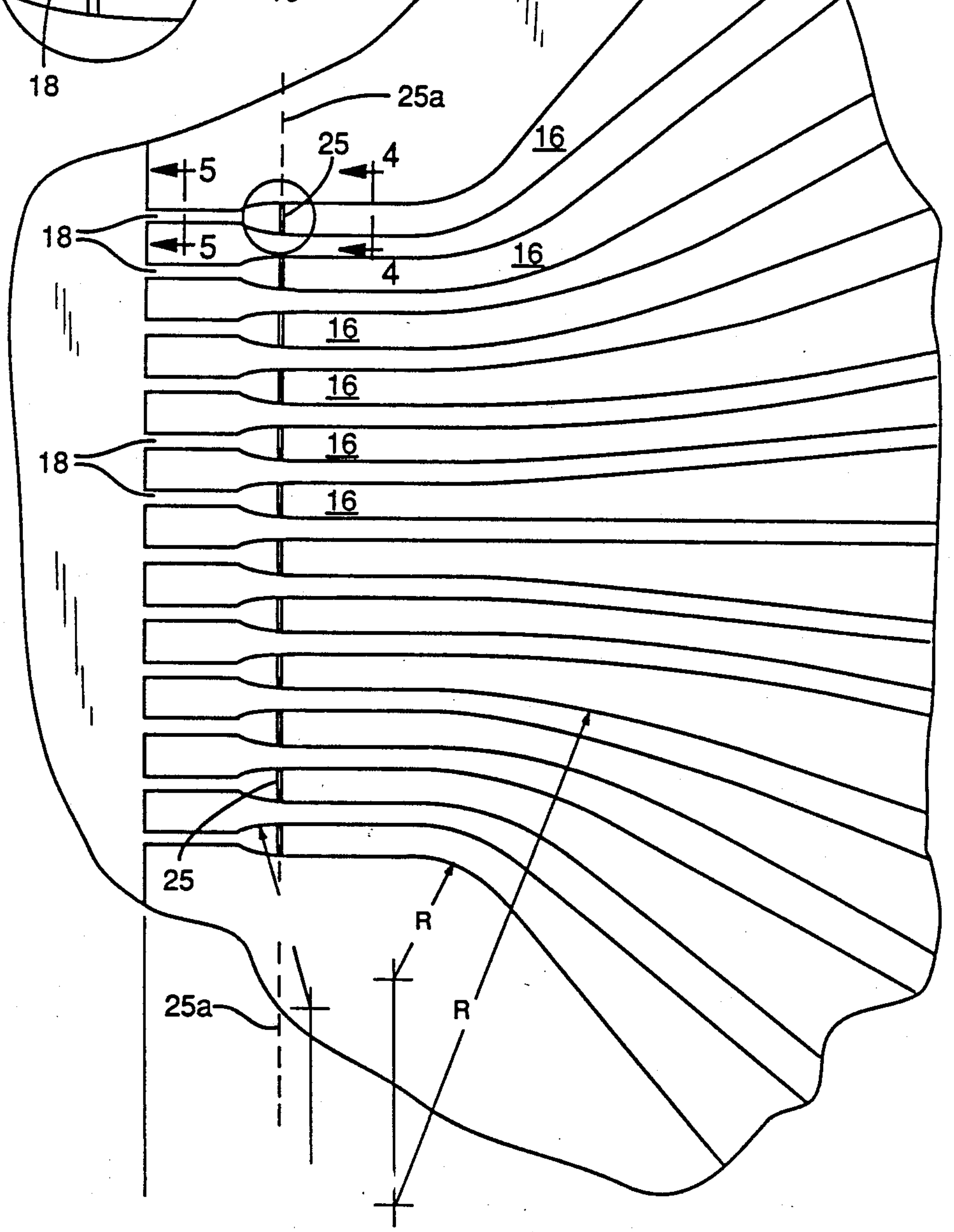
FIG. 2 is an enlarged plan view showing a portion of the base plate at the ink jet end of the print head.

FIGS. 2 and 2A show a portion of the ink channels 14 formed in the base plate 10, at the nozzle end of the base plate, in further enlarged view. FIG. 2A is very greatly enlarged, showing only a transition or barrier 25 between a downstream end of each ink chamber 16 and an upstream end of a corresponding ink jet nozzle 18. The barrier 25 is formed along a line 25*a* which is also indicated in FIG. 1, although the barriers themselves are not visible in FIG. 1.

The barrier 25 comprises a part of the method of the invention for fabricating the nozzle base plate 10 with sharp and consistent transitions between deeper and shallower areas, e.g. between the deeper ink chamber 16 and the shallower nozzle 18, as seen in FIGS. 2 and 2A.

Figure 3:
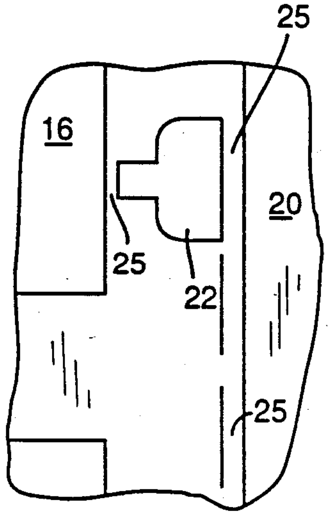
FIG. 3 is a further enlarged plan view showing a small portion of the print head glass base at the ink inlet end.

FIG. 3 is an enlarged view of an ink inlet or restrictor 22, between the manifold 20 and the ink chamber 16. The restrictor 22 has appropriate geometry to restrict the flow of ink, particularly in the counterflow direction (to the right in FIGS. 3 and 1, exiting the ink chamber 16) when pressure is applied on the chamber 16 to expel a droplet of ink from the nozzle. The restrictors 22 have appropriate geometry such that they provide somewhat of a barrier to the counterflow of ink during pulsing of an ink droplet.

In preferred embodiments of the invention, there is a transition line or barrier 25 at both the upstream and the downstream ends of the ink inlet. These are transition lines between shallower and deeper regions. For example, the manifold 20 region might have a depth of about 15 mils, which also might be depth of the ink chamber 16. The restrictor 22, on the other hand, might have a depth of only about 2 mils.

Similarly, at the opposite ends of the ink chambers 16, the ink chamber might have a depth of about 15 mils, while the nozzle region 18 might have a depth of about 2 mils.

Figure 4:
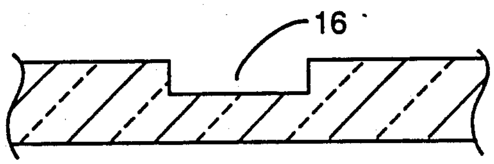
FIG. 4 is a transverse cross sectional view, as seen along the line 4—4 in FIG. 2.
Figure 5:
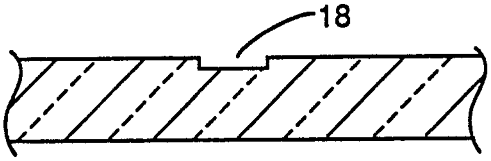
FIG. 5 is a transverse cross sectional view of the base plate, as seen along the line 5—5 in FIG. 2.
Figure 6:
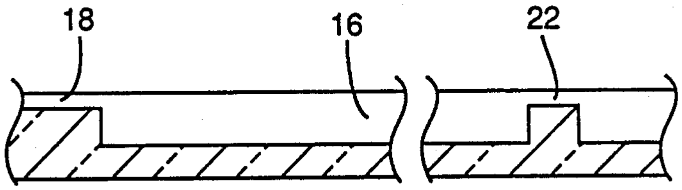
FIG. 6 is a longitudinal cross sectional fragmented view showing the length of an ink channel in the base plate.

FIGS. 4, 5 and 6 are cross sectional views illustrating the different depths of different regions of the base plate 10. FIG. 4 indicates the greater depth of an ink chamber 16 formed in the base plate, while FIG. 5 indicates the much shallower depth of a nozzle 18 or an inlet restrictor 22. Both of these are transverse cross sectional views, as indicated in FIG. 2. FIG. 6 is a longitudinal cross sectional view, schematically indicating the transitions in depth throughout the ink channel and including the different regions of the manifold, the inlet, the ink chamber and the nozzle. FIG. 6 also schematically indicates the desired sharp transition between the shallower and deeper areas in the base plate.

Figure 7:
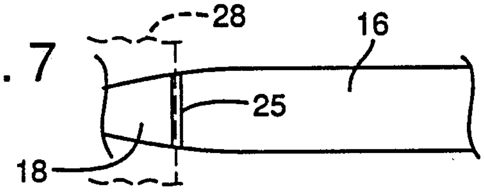
FIG. 7 is an enlarged plan view showing a portion of a single ink channel at a transition point between an ink chamber and an ink nozzle where the depth of the channel changes, and indicating masking of the base plate for a two-step acid etching procedure.
Figure 8:
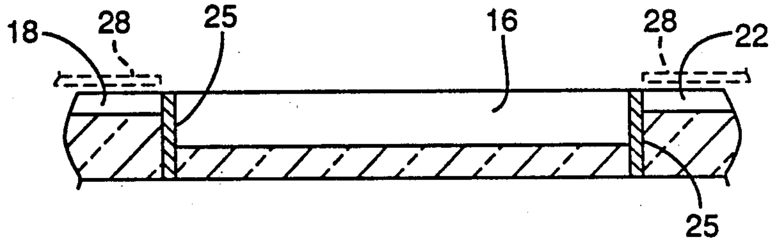
FIG. 8 is a longitudinal cross sectional fragmented view indicating photographically unexposed sections extending through the depth of the photoform glass base plate, which sections are substantially not etched in the acid etch procedure and remain as barriers.
Figure 9:
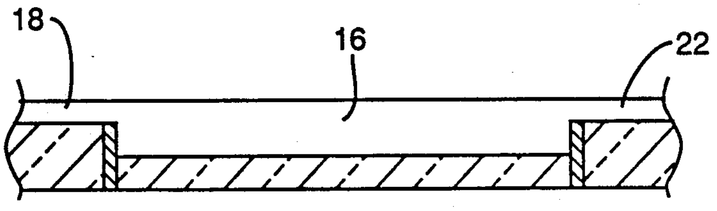
FIG. 9 is a cross sectional view similar to FIG. 8, showing the base plate after the upwardly extending barriers have been mechanically removed.

FIGS. 7, 8 and 9 relate to the method for forming the ink jet print head base plate 10 with the desired sharp, predictable and consistent transitions. FIG. 7 shows a portion of the transition or barrier 25 crossing an ink channel 14 between an the ink chamber 16 region and the nozzle 18 region. The barrier 25 has a width dimension which is large enough to enable consistent manufacturing, but narrow enough to permit the removal of a thin portion of material which remains after etching, as will be explained. later. The dimension may be about 19 microns, in a preferred embodiment of the invention.

As outlined above, the transition or barrier 25 is formed in the photo-exposing process of the photoform glass plate 12. In the exposure process, the lines or bands 25 are left unexposed. Then, when the photoform glass plate 12 is developed, these sharply formed lines or bands, like other areas of the base plate which are not to be etched but are to remain substantially unchanged, remain resistant to etching.

FIG. 7 indicates in dashed lines the application of tape 28 for masking the areas of the base plate which are to remain at the shallower depth. As indicated, the tape 28 (or other masking medium, such as a resist medium) extends generally to the barrier line or band 25, but because of the existence of this barrier band 25, the edge of the tape can vary somewhat in its position—it may come generally to either edge of the band 25 or to any point between those edges. This is considerable latitude in the application of the masking medium. The width of the band, as mentioned above, may be about 19 microns, and even if the tape extends over the barrier or band 25 to some extent, extending slightly over the deeper ink chamber region 16, the acid in the etching procedure will still reach all intended volume to be removed.

FIG. 8, a schematic longitudinal sectional view, illustrates the manner in which the barriers 25 function to prevent the acid in the etching procedure from penetrating to the regions 18 and 22 intended to be shallower, during the step wherein the shallower areas are masked. The barriers 25 actually extend through the depth of the photoform glass plate 12, as illustrated. Accordingly, they provide a barrier to action of the acid during the etching of the deeper region 16, throughout the entire intended depth of the deep region.

Once the masked etching step is completed, most of the depth of the deeper regions 16 and 20 has been etched away, but not the entire depth. The masking is then removed, and the second step of the etching procedure is initiated. In this step, the shallow regions 18 and 22 are etched out, and at the same time, the deeper region 16 (and 20, not shown in FIG. 8) is completed down to the final intended depth. As mentioned above, the deeper region 16 may have a depth of about 15 mils, while the shallower regions 18 and 22 may have a depth of only about 2 mils.

Once the two-step etching procedure has been completed, the barriers 25 remain, extending above the bottoms of the shallower regions 18 and 22 up to the top surface of the base plate, as indicated in FIG. 8. They would therefore serve as unwanted dams if left in this configuration. However, the portions of the barriers 25 extending above the shallow regions 18 and 22 can easily be removed by mechanical means. One preferred method of removing these remaining ridges is by sand blasting with a fine sand.

FIG. 9 shows a portion of the print head base plate in longitudinal section, similar to FIG. 8, but after the barrier ridges have been removed. The desired cross section has been achieved, with sharp and square transitions between the deeper region 16 and the shallower regions 18 and 22.

Figure 10:
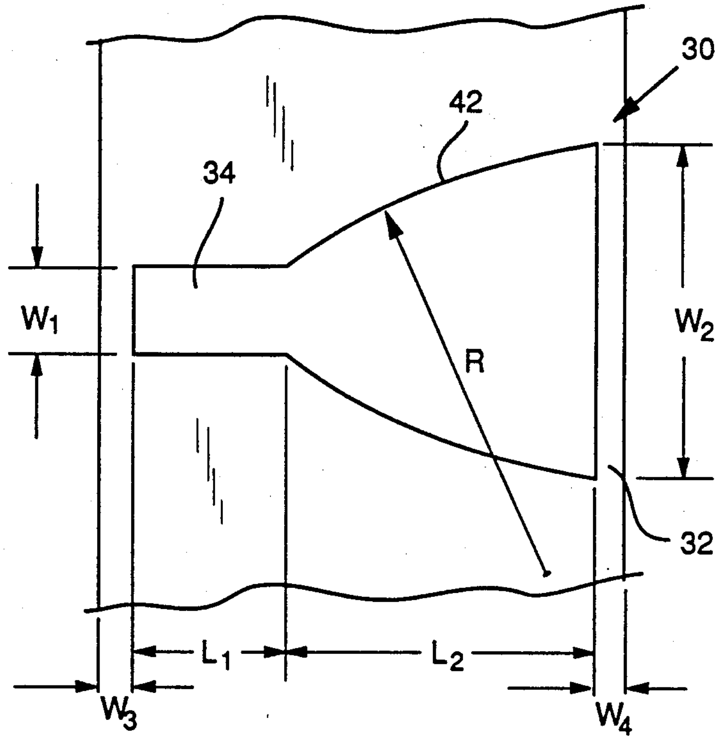
FIG. 10 is a greatly enlarged partial plan view of an ink jet nozzle, indicating variables in the geometry of the nozzle.
Figure 11:
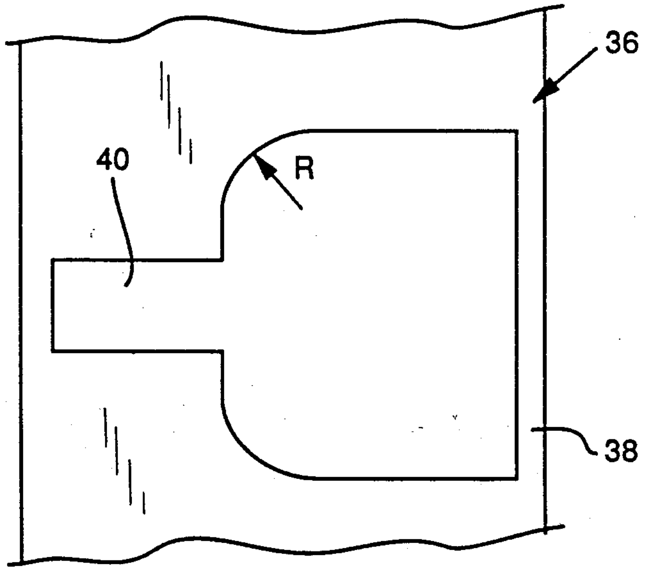
FIG. 11 is a similarly enlarged partial plan view of an ink inlet or restrictor, indicating variable geometry.

FIGS. 10 and 11 are greatly enlarged partial plan views of a nozzle and an ink inlet or restrictor, showing dimensional variables in the geometry of these elements. Preferably, the configuration 30 shown in FIG. 10, which has a more gradual taper from a wide upstream end 32 to narrow downstream or nozzle end 34, is used as in the ink jet nozzle, while the configuration 36 shown in FIG. 11 is used for the ink inlet or restrictor. The configuration of FIG. 11 also has a wide upstream or inlet end 38 and a narrow outlet or restricted end 40, but is not gradually tapered and becomes narrow much more abruptly than in the nozzle configuration 30 of FIG. 10.

As discussed above, it is important that a restriction be included at the ink inlet end of each ink channel 14, as well as at the nozzle 18. This is to prevent appreciable back flow of ink when a pulse of pressure is applied to the ink chamber 16.

Although either of the configurations shown in FIGS. 10 and 11 can be used for either an ink nozzle or an ink inlet, the gradually tapered configuration of FIG. 10 serves well as an ink nozzle. In a preferred embodiment, the configuration 30 of FIG. 10 has a gradual curve 42 in the tapering region, with a large radius. The width of the nozzle outlet $W_1$ should be in the range of about 10 to 125 microns. The inlet width $W_2$ is generally much larger, and can be in the range of about 10 to 2000 microns. $L_1$, the length of the restricted nozzle area 34, can be in the range of about 25 to 500. $L_2$, the length of the tapered region, can be also about 25 to 500 microns.

The widths $W_3$ and the $W_4$, which are removed after fabrication ($W_3$ is removed by cutting the assembled and laminated print head along the line 45 in FIG. 1), can be in the range of about 5 to 50 microns.

The values for $L_1$, $L_2$, $W_1$, $W_2$, $W_3$ and $W_4$ in the configuration shown in FIG. 11 can be similar to those shown in FIG. 10. The difference, as noted above, is the more abrupt ink flow restriction where the ink reaches the narrow restricted region 40 in the configuration 36.

Different geometry of the nozzle end and the ink inlet end can be selected so as to suit the particular type of ink used. Viscosity is the principal consideration.

The above described preferred embodiments are intended to illustrate the principles of the invention, but not to limit its scope. Other embodiments and variations to these preferred embodiments will be apparent to those skilled in the art and may be made without departing from scope of the invention as defined by the following claims.

I claim:

1. A method for fabricating an ink jet nozzle structure with at least one ink jet nozzle for delivery of an ink jet toward a surface, an ink chamber for each ink jet nozzle, positioned upstream of the jet nozzle, and at least one inlet for the flow of ink into the chamber, the method comprising, exposing one side of a transparent photoform glass base plate generally in a pattern to form the nozzle, the ink chamber and the inlet, such exposure making the exposed areas of the photoform glass much more susceptible to acid etching than unexposed areas, at selected transition points between the ink chamber and the nozzle, leaving a thin transverse line unexposed, across the transition point, acid etching said one side of the glass in a two-step etching wherein, in one step the nozzle area is masked substantially to said transition point and generally along said thin transverse line, and in a second step the masking is removed and the nozzle area is etched along with the ink chamber, thereby leaving a raised barrier along said thin transverse lines of unexposed glass, comprising essentially unetched glass extending transversely across the transition between the ink chamber and the nozzle area and deep into the base plate, and removing the barrier between the deeper ink chamber and the shallower nozzle area.

2. The method according to claim 1, wherein the removal of the barrier is accomplished by sandblasting.

3. The method according to claim 1, wherein the ink inlet comprises an ink inlet area shallower than the ink chamber, and wherein the ink inlet area is separated from the chamber by a second thin transverse line of unexposed glass formed during the exposing step, and the ink inlet area being masked during the first step of the two-step etching, the masking extending essentially to said second transverse unexposed line, so that the ink inlet area is formed with a depth generally the same as that of the nozzle area, and including removing the barrier at said second unexposed line after the etching after the etching process.

4. An ink jet nozzle structure having a base plate formed according to the method of claim 1.

* * * * *